United States Patent [19]

Benham

[11] Patent Number: 4,940,473
[45] Date of Patent: Jul. 10, 1990

[54] CYCLONE SOLIDS SEPARATOR AND DE-GASIFIER

[76] Inventor: Roger A. Benham, 4481 Olive Ave., La Mesa, Calif. 92041

[21] Appl. No.: 367,334

[22] Filed: Jun. 16, 1989

[51] Int. Cl.$^5$ .............................................. B01D 19/00
[52] U.S. Cl. ........................................ 55/205; 55/319; 55/417; 55/460; 210/167; 210/188
[58] Field of Search .................. 55/171, 176, 177, 204, 55/205, 215, 216, 319, 417, 459.1, 460; 210/167, 188, 195.1, 196

[56] References Cited

U.S. PATENT DOCUMENTS

| Re. 20,051 | 7/1936 | Walker | 55/171 X |
|---|---|---|---|
| 2,434,596 | 1/1948 | Spieth | 55/205 X |
| 2,757,582 | 8/1956 | Freeman et al. | 55/177 X |
| 2,816,490 | 12/1957 | Boadway et al. | 55/177 X |
| 2,876,860 | 3/1959 | Clark et al. | 55/177 |
| 2,923,151 | 2/1960 | Engle et al. | 210/188 X |
| 3,044,236 | 7/1962 | Bearden et al. | 55/204 |
| 3,151,961 | 10/1964 | Blackmore et al. | 55/205 |
| 3,359,708 | 12/1967 | Barber | 55/205 X |
| 3,376,977 | 4/1968 | Gordon et al. | 55/171 X |
| 3,486,306 | 12/1969 | Blackmore et al. | 55/205 |
| 3,771,290 | 11/1973 | Stethem | 55/205 |
| 4,306,967 | 12/1981 | Trautwein | 210/167 |
| 4,328,013 | 5/1982 | Godare et al. | 55/204 X |
| 4,424,068 | 1/1984 | McMillan | 55/176 X |
| 4,475,932 | 10/1984 | Hull et al. | 55/204 X |
| 4,663,035 | 5/1987 | Rosander | 210/167 |

FOREIGN PATENT DOCUMENTS 0024148 2/1981 European Pat. Off. .............. 55/171

Primary Examiner—Robert Spitzer
Attorney, Agent, or Firm—Baker, Maxham, Jester & Meador

[57] ABSTRACT

A combination solids separator and de-gasifier for a recirculating hot water system comprises a generally cylindrical vertically oriented reservoir having a wall separating the reservoir into upper and lower chambers, a central opening in the wall communicating between the upper and lower chambers, an inlet into the lower chamber tangential to an outer diameter thereof, an outlet from the upper chamber tangential to an outer diameter thereof, a float or manually controlled gas vent at the top of the reservoir for controllably venting gas from the chamber, a vortex inducing conical wall extending from the inlet toward the bottom of the reservoir, and a solids removal port at the bottom of the reservoir.

16 Claims, 2 Drawing Sheets

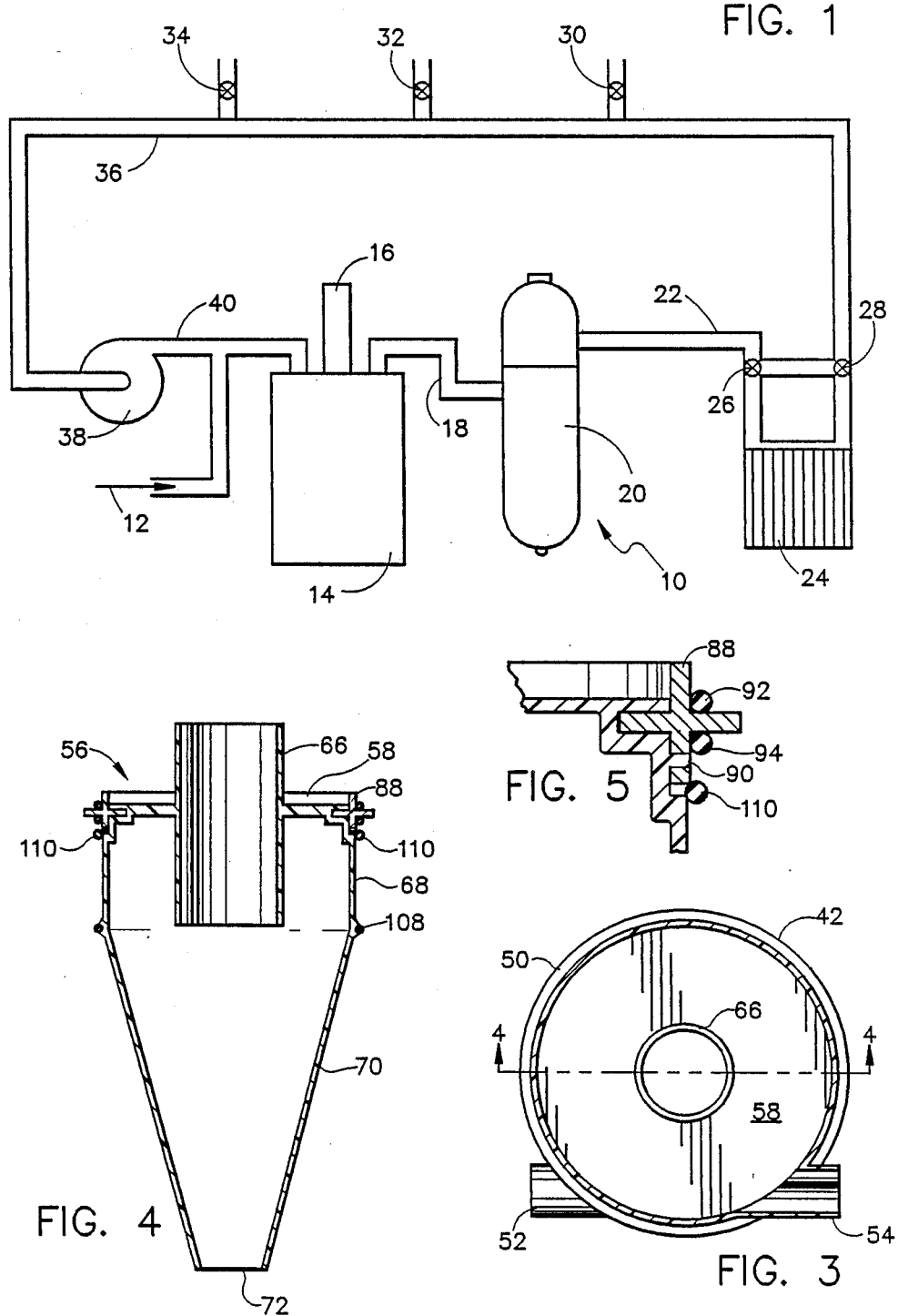

CYCLONE SOLIDS SEPARATOR AND DE-GASIFIER

BACKGROUND OF THE INVENTION

The present invention relates to corrosion control for recirculating hot water systems, and pertains particularly to a system and method for removal of corrosive particles and gases from recirculating hot water systems.

Corrosion has been a major problem for recirculating hot water systems for some time. Failure due to corrosion occurs in many forms and under many different conditions. For this reason, there has been continuous debate as to the causes of the corrosion problems.

One major form of corrosion that leads to failure of pipe systems is that of impingement corrosion. This type of corrosion occurs where gases and solids in liquids impinge on the metal surfaces of the plumbing at high velocities. Rapidly moving bubbles (air or gas) and particles (grit and scale) can strip away the naturally occurring protective films that occur and protect copper piping. When this occurs, the metal corrodes at a more rapid rate in an effort to reestablish the protective film. However, because the film is being swept away as fast as it is being formed, the corrosion proceeds at a high rate, leading to early failure.

There are basically two forms of impingement corrosion. A first form is erosion-corrosion, which is caused by solids (grit and scale) in liquids mechanically abrading the surface of the metal. A second form is cavitation caused by gas bubbles, which forms and collapses in the liquid in response to pressure and directional changes in the liquid. The collapse of the bubbles exerts forceful hammer-like blows on the metal surface.

The heating of water drives out of solution most of the air and gas therein, which has a high percent of carbon dioxide ($CO_2$), which is itself destructive to copper. Dissolved gases are a major factor contributing to the corrosion of metal.

Corrosion is an electro chemical phenomenon. It increases with increase in temperature. Increasing temperature reduces the solubility of most gases, including oxygen and carbon dioxide ($CO_2$), such that they are released as temperature increases. For a closed system in which oxygen and $CO_2$ cannot escape, corrosion continues to increase at least linearly with increase in temperature. Other gases may also be present in water which are also undesirable. These, for example, may be volatile organic compounds which are desirable to remove from water. Carbon dioxide is a gas that is more soluble than oxygen and will convert to carbonic acid, producing a solution where acid attack, and the subsequent lowering of Ph, can dominate, creating a more corrosive condition to metals.

Gases trapped in water also, as previously explained, cause cavitation. This occurs in moving water where the flow is disturbed so as to create local pressure drops. Under these conditions, a vapor bubble will form, then collapse, applying a momentary stress of up to 1379 MPa (200 ksi) to the surface. Current theories is that this repeated mechanical working of the surface creates a local fatigue situation that aids the removal of metal. Impingement attack can be reduced and the life of the unit extended by decreasing fluid velocity, streamlining the flow, and removing entrained air. In the past, this is usually accomplished by designing water boxes, injector nozzles and piping to reduce or eliminate low pressure pockets, obstructions to smooth flow, and abrupt changes in flow direction, and other features that cause local regions of high velocity or turbulent flow.

Impingement corrosion can also result from the presence of hard water which predominates throughout the United States. Hard water is a widespread problem in the United States as ground water percolates through limestone rock and dissolves calcium and magnesium minerals, which remain in solution, creating hardness measures, in grains per gallon. According to the Water Quality Association, eighty-five percent of the potable water supplied in the United States is to some degree hard, based on the contents of dissolved minerals in the water. When hard water is heated, the minerals precipitate out of solution and quickly solidify into hard scale or turning back into limestone. Scale layers can build up, choking hot water pipes, fouling thermostats and encrusting hot water heater elements, etc. These scales also form particles that are suspended in the water and carried along with it, resulting in impingement of the walls of the water system, and ultimate erosion thereof.

Many attempts and proposals have been made in the past to remove these solids and gases. However, these attempts have not been satisfactory.

It is, therefore, desirable that an improved system and method be available for the elimination of these corrosive agents from hot water systems.

SUMMARY AND OBJECTS OF THE INVENTION

It is, therefore, the primary object of the present invention to provide improved means for reducing failure in circulating hot water systems.

In accordance with a primary aspect of the present invention, a combined solids separator and de-gasifier is provided, which also includes an expansion chamber.

BRIEF DESCRIPTION OF THE DRAWING

The above and other objects and advantages of the present invention will become apparent from the following description when read in conjunction with the drawings wherein:

FIG. 1 is a schematic illustration of a typical recirculating hot water system;

FIG. 3 is a view taken on line III—III of FIG. 2;

FIG. 4 is a side elevation view in section of the cone assembly;

FIG. 5 is an enlarged detail view showing details of the mounting ring of the cone assembly;

DETAILED DESCRIPTION OF A PREFERRED EMBODIMENT

Figure 6:
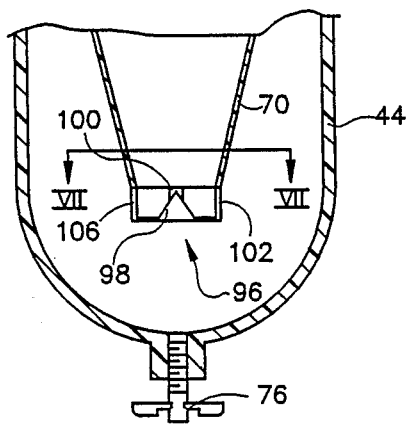
FIG. 6 is a partial view like FIG. 2 showing an alternative embodiment.

Referring to FIG. 1 of the drawings, there is illustrated a typical recirculating hot water system, designated generally by the numeral 10, wherein a source of supply water 12 is fed into a hot water heater 14, which may be either of the tank type or the tankless tube type having a gas flue 16. Heated water is supplied via an outlet line 18 to a cyclone separator and de-gasifier 20, in accordance with the invention, wherein solids and gases are separated from the water, as will be subsequently explained. Water with the solids and gases separated therefrom is then passed along a pipe or conduit 22, wherein it supplies water, for example, to hot water heating system 24 for the housing unit, which is controlled for example by valves 26 and 28. Water may be bypassed the hot water system and supplied to source uses, such as valve 30 for bathroom or kitchen supply and other valves 32 and 34.

The water system continuously circulates water through the pipe 36 by means of a circulating pump 38, which circulates the water back by way of pipe 40 to the hot water heater 14. This circulating hot water system assures that hot water is immediately available to each demand station on a continuous supply basis. This eliminates the need to drain cold water or let the faucet run for several minutes to waste cold water until hot water is supplied.

Circulating hot water systems are common in larger domestic systems, such as apartment houses, office buildings and the like. Such systems are becoming increasingly available to single family dwellings and smaller commercial and industrial buildings.

Figure 2:
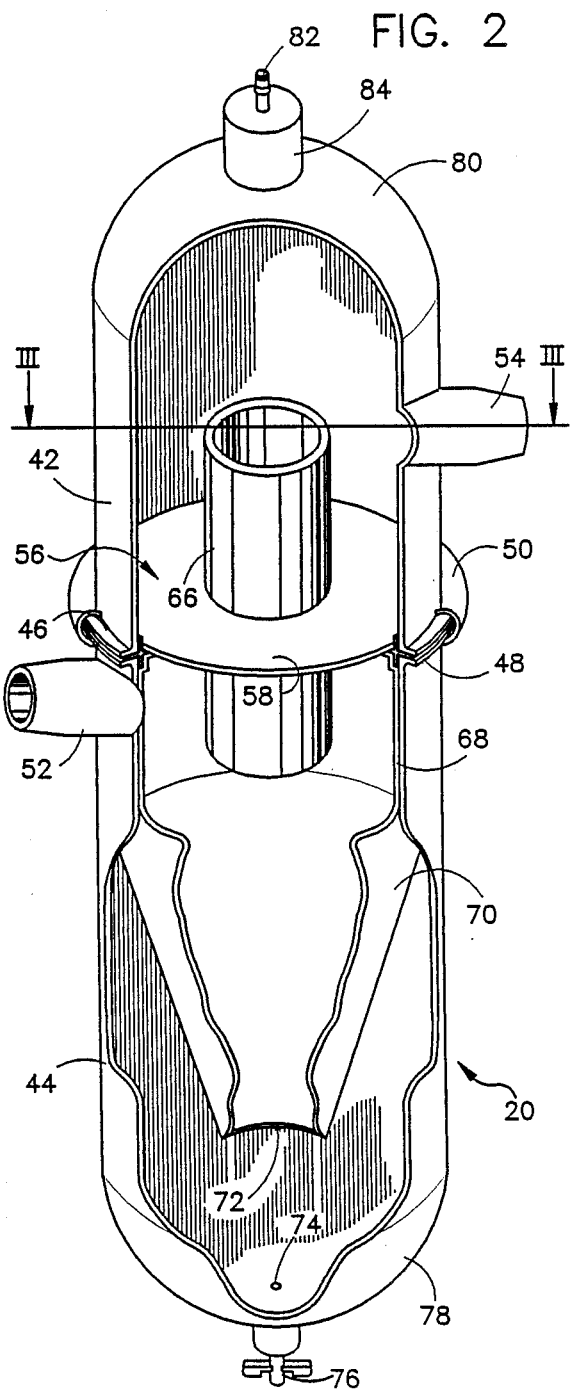
FIG. 2 is a perspective view with portions broken away to reveal details of the separator of the present invention.

Turning now to FIG. 2 of the drawing, there is illustrated a cyclone separator and de-gasifier in accordance with the invention which, as will be explained, separates any suspended solids from the water in the system, any gases therein, certain volatile organic compounds, and provides a thermal and pressure expansion tank to accommodate changes in pressure within the system.

The cyclone separator and de-gasifier unit 20 comprises a pressure vessel having a generally cylindrical configuration, with an upper tank or vessel shell 42 and a lower vessel or shell 44. These shells are each provided with a flange 46 and 48, respectively, which enable them to be detachably secured together to form the enclosed vessel by means of an annular ring clamp 50. An inlet 52 opens tangentially into the lower vessel 44, and an outlet 54 opens tangentially out of the upper vessel 42 in a common rotary direction with the inlet. This arrangement conserves energy as will be explained.

The vessels (FIG. 2) are secured together and in the securing together, secured within the position separating them is a baffle and cone assembly, designated generally by the numeral 56 (FIGS. 2 and 4). This baffle assembly comprises a circular disk 58, having a cylindrical tubular extension 66 extending axially thereof and axially of the vessel into the upper and lower vessels. This assembly separates the upper and lower vessels into respectively an upper air or gas separation chamber 50 and a lower or solids separation chamber.

Secured to and extending downward from the circular disk wall 58 is a conical wall unit, as shown in FIG. 4, which comprises a cylindrical portion 68 secured at an upper end to the lower side of disk 58, and extending downward where a cone portion 70 converges inward toward the axis of the vessel and downward toward the bottom thereof. This forms a cyclone vortex chamber forcing the water to spin at a higher velocity as it travels downward, forcing solids which are directed outward and downward by the velocity to be separated from the liquid.

The solids that are separated by the water collect at the bottom of the tank, where they are discharged by means of an outlet 74 and a periodically controlled purge valve 76. The lower end of the vessel has a somewhat dome shape end 78, as illustrated in the preferred configuration. Similarly, the upper vessel member 42 has an end 80, preferably having a somewhat domed configuration, as illustrated, with an air or gas outlet 82 provided with a gas purge valve 84 that purges gas from the system. The upper and lower sections of the vessel are each preferably formed of a single deep drawn steel shell forming the ends and flanges. The bottom section is preferably formed of the same deep drawn steel, cut at the center with a tubular section welded in to extend the length thereof.

The baffle assembly and vortex cone is preferably constructed of a polypropylene material and is detachably mounted within the pressure vessel, which itself may be constructed either of a stainless steel or a carbon steel of about fourteen gauge as desired. A retaining ring 88, as illustrated in FIGS. 4 and 5, is integrally molded into the cone assembly and extends into the flange area between the two vessels for retaining and mounting the baffle and cone assembly within the vessel. The retaining ring is preferably of die cast aluminum, and is provided with a plurality of bores 90 into which the molded polyethylene extends to lock the ring thereto. The ring 88 also acts as an O-ring retainer for O-rings 92 and 94, which seals the upper and lower vessel shells 42 and 44 together. The cone assembly is preferably provided with an O-ring seal 108 at the juncture of the cylindrical wall 68 and cone 70 and one 110 at the lower edge of ring 88.

Figure 7:
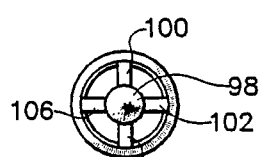
FIG. 7 is a view taken on line VII—VII of FIG. 6.

Referring to FIGS. 6 and 7, an eddy cone 96 may be added to the lower end of the vortex cone 70. The eddy cone comprises a cone member 98, which is mounted by a plurality of arms 100, 102, 104 and 106 to the lower end 72 of the cone 70. This cone assembly helps create an eddy at the lower end of the vessel to aid in settling solid abrasive particles into the bottom of the vessel for purging via purge valve 76.

A typical configuration for a three to approximately fifty gallon per minute system would be a tank on the order of about twenty-four inches in height and approximately seven inches in diameter, with the lower tank portion being about eighteen inches in length, with the upper tank being approximately six inches. The conical lower wall section would begin at approximately three inches below the juncture of the upper and lower vessels, and extend downward for a length of about nine inches for the specified system, leaving a distance of approximately three inches from the lower end of the cone to the bottom of the vessel. The cone would have an opening in the lower end of about two and one-half inches in diameter. In some instances, a lower cone may be desirable in the separation of the solids from the water. The cone assembly also is preferably provided with a lower O-ring 108 seated in an annular groove and sealingly engaging the inner wall of the vessel. The outer surface of the cone and the inner surface of the reservoir form an annular chamber, which maintains a pocket of compressible air providing for expansion typically experienced by hot water systems.

In operation, a vessel is placed on line in the plumbing of a circulating water system. As water enters the unit, it enters the vessel below the baffle and begins a circular motion, filling the lower end of the vessel and then flowing upward through the tubular baffle portion into the upper chamber. As the water circulates, solids within the water are centrifuged outward and drop downward into the bottom of the vessel. The circulating water creates pressure differential, which causes gas to separate and gas bubbles arise along the axis of the vessel, passing with water upward through the central baffle into the upper vessel chamber to the top of the vessel wherein it is periodically purged by the purge valve or automatically purged by a float valve. Additional air may be injected into the unit to aid in the removal of volatile organic compounds. The circulating water rotates in a specified direction, and with the tangential inlet and complimentary tangential outlet, the water flows outward from the wall of the vessel along a tangent line to the outlet, conserving the rotational energy imparted to the liquid within the vessel. This eliminates an unnecessary pressure differential within the system that is typical of conventional cyclone separators that are used, for example in refineries and like installations. The solids are periodically purged from the lower end of the vessel, with the gases purged from the upper end of the vessel.

With this arrangement, gases and solids are effectively removed from water or other liquids in a system, eliminating many of the problems caused by such contaminants in the liquid. Therefore, the invention and its concept is applicable to the problem of removal of gases and solids from any incompressible fluid.

While I have illustrated and described my invention by means of specific embodiments, it is to be understood that numerous changes and modifications may be made therein without departing from the spirit and scope of the invention as defined in the appended claims.

I claim:

1. A combination solids separator and de-gasifier for a flowing liquid system comprising:
   a generally cylindrical vertically oriented reservoir having a wall separating said reservoir into upper and lower chambers;
   a central opening in said wall communicating between said upper and lower chambers;
   an inlet into said lower chamber tangential to an outer diameter thereof;
   an outlet from said upper chamber;
   a gas vent at the top of said reservoir for controllably venting gas from said chamber;
   a vortex inducing conical wall extending from said inlet toward the bottom of said reservoir; and
   a solids removal port at the bottom of said reservoir.

2. A system according to claim 1 wherein:
   said central opening comprises a tubular member extending into said upper chamber and said lower chamber.

3. A system according to claim 2 wherein:
   said inlet and said outlet are each at a tangent to the outer diameter of said reservoir so that said inlet induces a swirl to the liquid in said reservoir; and
   said outlet is in a direction for receiving said liquid in said reservoir in its direction of the swirl.

4. A system according to claim 3 wherein:
   said reservoir is formed of upper and lower shells secured together along a circular seam; and
   said conical wall is defined by a vortex cone assembly detachably mountable in said reservoir between said upper and lower shells, and comprising a cylindrical upper section having a circular wall at the upper end thereof, and a cone extending downward therefrom and having a opening at the apex thereof.

5. A system according to claim 4 wherein:
   said vortex cone assembly includes a radial flange disposed at said circular seam for extending between cooperative radial flanges of said upper and said lower shells for supporting said cone assembly in position.

6. A system according to claim 5 wherein:
   said reservoir includes an expansion chamber in the lower chamber thereof.

7. A system according to claim 1 wherein:
   said reservoir includes an expansion chamber in the lower chamber thereof.

8. A system according to claim 1 wherein:
   said outlet is at a tangent to the outer diameter of said reservoir in a common direction with said inlet.

9. A system according to claim 1 wherein:
   said inlet and said outlet are each at a tangent to the outer diameter of said reservoir so that said inlet induces a swirl to the liquid in said reservoir; and
   said outlet is in a direction for receiving said liquid in said reservoir in its direction of swirl.

10. A system according to claim 1 wherein:
    said reservoir is formed of upper and lower shells secured together along a circular seam; and
    said conical wall is defined by a vortex cone assembly detachably mountable in said reservoir between said upper and lower shells, and comprising a cylindrical upper section having a circular wall at the upper end thereof, a tubular member extending above and below said wall, and a cone extending downward therefrom and having an opening at the apex thereof.

11. In a recirculating hot water system comprising a water heater, a source of water to said heater and a looped conduit system for continuously circulating water from said heater to at least one point of demand, the improvement comprising:
    a generally cylindrical vertically oriented reservoir formed of upper and lower shells secured together along a circular seam;
    a vortex cone assembly detachably mountable in said reservoir between said upper and lower shells, and comprising a cylindrical upper section having a circular wall at the upper end thereof separating said reservoir into upper and lower chambers, and a cone extending downward therefrom and having an opening at the apex thereof, an elongated tubular member extending through said wall into both said upper and lower chambers;
    an inlet into said lower chamber tangential to an outer diameter thereof;
    an outlet from said upper chamber;
    a gas vent at the top of said reservoir; and
    a solids removal port at the bottom of said reservoir.

12. A system according to claim 11 wherein:
    said inlet and said outlet are each at a tangent to the outer diameter of said reservoir so that said inlet induces a swirl to the water in said reservoir; and
    said outlet is in a direction for receiving said water in said reservoir in its direction of swirl.

13. A system according to claim 12 wherein:
    said vortex cone assembly includes a radial flange disposed at said circular seam for extending between cooperative radial flanges of said upper and said lower shells for supporting said cone assembly in position.

14. A system according to claim 13 wherein:
    said reservoir includes an expansion chamber in the lower end thereof defined by opposing walls of said cone and said lower shell.

15. In a recirculating hot water system comprising a water heater, a source of water to said heater and a looped conduit system for continuously circulating water from said heater to at least one point of demand, the improvement comprising:

a generally cylindrical vertically oriented reservoir formed of upper and lower shells having radially extending annular flanges and secured together along a circular seam defined by said flanges;

a vortex cone assembly detachably mountable in said reservoir and including a radial mounting flange extending between said annular flanges of said upper and lower shells, and comprising a cylindrical upper section having a circular wall at the upper end thereof separating said reservoir into upper and lower chambers, and a cone extending downward therefrom and having an opening at the apex thereof, an elongated tubular member mounted in said wall and extending upward into said upper chamber and extending downward into lower chambers;

an inlet into said lower chamber tangential to an outer diameter thereof so that said inlet induces a swirl to the water in said reservoir;

an outlet from said upper chamber at a tangent to the outer diameter of said reservoir in a direction for receiving said water in said reservoir in its direction of swirl;

a gas vent at the top of said reservoir for venting gas therefrom; and a solids removal port at the bottom of said reservoir for removing solids therefrom.

16. A system according to claim 15 wherein:

said reservoir includes an expansion chamber in the lower end thereof defined by opposing walls of said cone and said lower shell.

* * * * *